No. 775,991. Patented November 29, 1904.

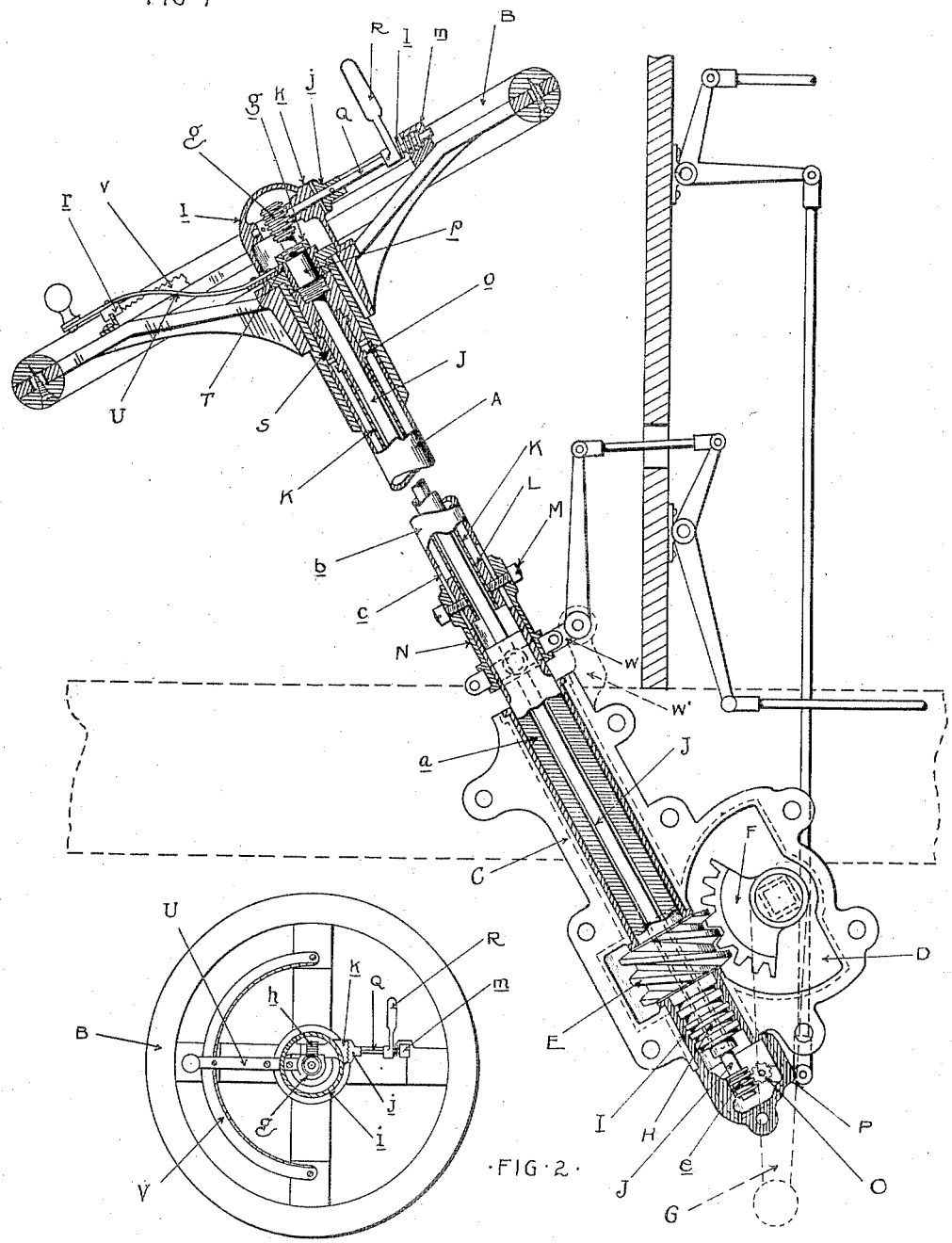

UNITED STATES PATENT OFFICE.

CHARLES SCHMIDT, OF DETROIT, MICHIGAN, ASSIGNOR TO THE PACKARD MOTOR CAR COMPANY, OF DETROIT, MICHIGAN.

STEERING-GEAR AND MOTOR-CONTROLLING MECHANISM FOR MOTOR-VEHICLES.

SPECIFICATION forming part of Letters Patent No. 775,991, dated November 29, 1904.

Application filed March 21, 1904. Serial No. 199,275. (No model.)

*To all whom it may concern:*

Be it known that I, CHARLES SCHMIDT, a citizen of the United States, residing at Detroit, in the county of Wayne and State of Michigan, have invented certain new and useful Improvements in Steering-Gear and Motor-Controlling Mechanism for Motor-Vehicles, of which the following is a specification, reference being had therein to the accompanying drawings.

The invention relates to the steering-gear and motor-controlling mechanism for motor-vehicles; and it consists in the construction as hereinafter set forth.

In the drawings, Figure 1 is a longitudinal section through the steering-stem and connected mechanism. Fig. 2 is a sectional plan view of the stem and hand-wheel for operating the same.

A is a revoluble steering-stem which is provided at its upper end with a hand-wheel B, fixedly secured thereto. At its lower end this stem is journaled in a suitable bearing C, which is preferably formed integral with the housing D for inclosing the gearings E and F, connecting the stem with the rock-arm G, which is connected by rods to the steering-wheels. The gears E and F are preferably a worm and sector, and the stem A is preferably provided below the worm with a stepped portion H, engaging the corresponding bearing I and forming a thrust-bearing. As shown, the stem A comprises a lower section $a$, which is journaled in the bearing C and has mounted thereon or formed integral therewith the worm E. This section is also hollow, having an axial passage therethrough of sufficient size to receive a rod J. The upper section $b$ of the stem A is preferably formed of a tube which is brazed or otherwise secured to the upper end of the section $a$ and has secured at its upper end the hand-wheel B. The bore of the tube $b$ is larger than that of the section $a$, so that it is adapted to receive in addition to the rod J a tubular rod K. This tubular rod is sleeved upon the rod J and at its lower end is secured to a collar L, slidingly fitted within the tube $b$. The collar L is attached by screws or pins M passing through longitudinal slots $c$ in the tube $b$, with a collar or sleeve N at the side of the stem A. The rod J extends completely through the stem A, and at its lower end has secured thereto below the bearing I a cylindrical rack $e$. This rack is in mesh with the pinion O, secured to a rock-arm P, which is connected by suitable rods and levers with a throttle or controlling valve (not shown) for the engine. The racks $e$ and pinion O are preferably housed in a suitable casing formed at the lower end of the bearing I. At the upper end of the rod J is secured a corresponding cylindrical rack $g$, which meshes with a pinion $h$ on a rock-shaft Q. This rock-shaft is provided with an operating-handle or finger-piece R and is journaled in bearings upon the hand-wheel B and in a housing $i$, which incloses the rack and pinion. The shaft also has secured thereto the notched collar $j$, which is adapted to engage with a correspondingly-notched bearing $k$ on the housing $i$ and is normally held in engagement therewith by the tension of a spring $l$. This spring is preferably arranged in a recess in the bearing $m$ for the upper end of the shaft Q and operates to brace the shaft longitudinally, so as to hold the collar $j$ and bearing $k$ in engagement. At the same time the spring is sufficiently yielding to permit of the rocking of the shaft by the handle R and a disengagement of the collar $j$ from the bearing $k$.

The tubular rod K, which is sleeved upon the rod J, has secured to its upper end a worm or screw $o$, which is adapted to engage with a correspondingly-threaded bearing in a nut S, revolubly fitting within the stem A. This nut has a shouldered engagement with the cap T for the stem, preferably formed by a shank $p$, passing through said cap and secured to the nut, and a lever U, secured on said stem by the clamping-nut $q$. Thus the lever U is arranged outside of the cap T and is adapted when rocked to impart a corresponding rotary movement to the nut S within the stem. The lever U passes outward through a slot in the housing $i$ and has at its outer end a detent $r$, which is adapted to engage with a notched segment V on the hand-wheel B.

The sleeve N on the outside of the stem A is suitably connected by intermediate rods and levers with the sparking mechanism (not shown) for the motor. The connection shown comprises a forked rock-arm W, which engages a groove in the sleeve N and is fulcrumed in a bearing W' on the bearing C.

The parts being constructed as shown and described, in operation the stem A may be revolved in either direction by a suitable movement imparted to the hand-wheel B and through the intermission-gears E and F will correspondingly move the rock-arm G, thereby effecting the turning of the steering-wheels. To effect adjustment of the throttle or engine controlling valve, the handle R, which is carried by the wheel B, may be moved to rock the shaft Q, which through the pinion $h$ engaging with the cylindrical rack $g$ will move the rod J longitudinally within the stem A. This movement will cause the cylindrical rack $e$ at the opposite end of said rod to effect the corresponding rotation of the pinion O and through the rock-arm P and its connections will operate the controlling-valve. The mechanism just described is equally operated in all positions of adjustment of the hand-wheel B, which carries the handle R and rock-shaft Q. This is for the reason that the cylindrical racks $g$ and $e$ will permit of a rotary movement of the rod J without effecting the engagement of either of said racks with their respective pinions O and $h$.

To adjust the sparking mechanism, the lever U may be moved over the segment V and through its connection with the nut S will revolve the latter, thereby causing a longitudinal movement of the tubular rod K. This rod being connected, through the collar L and screws M, with the sleeve N will cause a longitudinal movement of the latter upon the stem A and through the connection with the rock-arm W will cause the actuation of the mechanism leading to the sparker.

It will be understood that the rotation of the hand-wheel B will not in any way affect the adjustment of either of the mechanisms respectively controlled by the handle R and the lever U, and, as has already been stated, these mechanisms are freely adjustable in all positions of said wheel. Thus the operator has complete control over both the steering mechanism and the motor-controlling device.

What I claim as my invention is—

1. The combination with a hollow rotary steering-stem, of a reciprocatory rod passing therethrough, said rod being supported at one end in a bearing revolving with said stem, and at its opposite end in a bearing independently revoluble from said stem, a cylindrical rack at one end of said rod and a pinion meshing therewith, permitting of the independent rotation of said rod.

2. The combination with a hollow rotary steering-stem, of a reciprocatory rod passing therethrough, and connections at opposite ends of said stem, each comprising a cylindrical rack on the stem, and a pinion meshing therewith.

3. The combination with a hollow rotary steering-stem, of a reciprocatory rod passing centrally through said stem, a tubular reciprocatory rod surrounding said central rod within said stem, means for holding said tubular rod in rotary fixed relation to said stem, an operating-handle having a screw engagement with said tubular rod and independently rotatable from said stem, said handle member forming a supporting-bearing for one end of said central rod; cylindrical racks at opposite ends of said central rod, and pinions meshing with said racks permitting of the independent rotation thereof.

4. The combination with a hollow rotary steering-stem, of a reciprocatory rod passing therethrough, a cylindrical rack on said rod, a hand-wheel on said stem, a rock-shaft journaled in bearings on said hand-wheel, and a pinion on said rock-shaft meshing with said cylindrical rack and permitting of the independent rotation of the latter.

5. The combination with a hollow rotary steering-stem, of a reciprocatory rod passing therethrough, a rack at the upper end of said rod, a hand-wheel at the upper end of said stem, a rock-shaft journaled in bearings on said hand-wheel, a pinion on said rock-shaft meshing with said cylindrical rack, a notched collar on said shaft engaging a detent on said wheel, a spring for yieldingly pressing said shaft longitudinally to hold said collar in engagement with said detent, and a handle on said rock-shaft for operating the same.

6. The combination with a hollow rotary steering-stem, of a reciprocatory rod passing centrally through said stem, a tubular reciprocatory rod sleeved upon said central rod, a lever pivoted in said stem and having a screw engagement with said tubular rod, a cylindrical rack on said central rod beyond said lever, a pinion meshing therewith, a rock-shaft on which said pinion is mounted, a handle for rocking said shaft, and a housing inclosing said pinion and rack, having a slot for the operation of said lever.

7. The combination with a hollow rotary steering-stem, of a reciprocatory rod passing through said stem, a tubular reciprocatory rod surrounding said central rod within said stem, means for holding said tubular rod in rotary fixed relation to said stem, an operating-handle having a screw engagement with said tubular rod and independently rotatable from said stem, said handle member and supporting member bearing on said central rod.

8. The combination with a hollow rotary steering-stem, of a reciprocatory rod passing therethrough, a rack at the upper end of said rod, a hand-wheel at the upper end of said stem, a rock-shaft journaled in bearings on said hand-wheel, a pinion on said rock-shaft meshing with said cylindrical rack, and a handle on said rock-shaft for operating the same.

9. The combination with a hollow rotary steering-stem, of a reciprocatory rod passing centrally through said stem, a tubular reciprocatory rod sleeved upon said central rod, a lever pivoted in said stem and having a screw engagement with said tubular rod, a cylindrical rack on said central rod beyond said lever, a pinion meshing therewith, a rock-shaft on which said pinion is mounted, and a handle for rocking said shaft.

In testimony whereof I affix my signature in presence of two witnesses.

CHARLES SCHMIDT.

Witnesses:
  A. CHAMPION,
  HENRY B. JOY.